(12) United States Patent
Kowalczyk et al.

(10) Patent No.: US 7,869,682 B2
(45) Date of Patent: Jan. 11, 2011

(54) FIBER OPTIC ENCLOSURE WITH TEAR-AWAY SPOOL

(75) Inventors: Scott C. Kowalczyk, Savage, MN (US); Trevor D. Smith, Eden Prairie, MN (US); Jonathan R. Kaml, Shakopee, MN (US); Thomas G. LeBlanc, Westminster, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 268 days.

(21) Appl. No.: 12/199,923

(22) Filed: Aug. 28, 2008

(65) Prior Publication Data

US 2009/0060441 A1 Mar. 5, 2009

Related U.S. Application Data

(60) Provisional application No. 60/970,185, filed on Sep. 5, 2007.

(51) Int. Cl.
*G02B 6/00* (2006.01)

(52) U.S. Cl. .................. 385/135; 385/134; 385/136; 385/137

(58) Field of Classification Search .......... 385/134, 385/135, 136, 137
See application file for complete search history.

(56) References Cited

U.S. PATENT DOCUMENTS

| | | | |
|---|---|---|---|
| 1,276,825 A | 8/1918 | Swope | |
| 1,442,999 A | 1/1923 | Boardman et al. | |
| 1,446,410 A | 2/1923 | McCormick et al. | |
| 1,474,580 A | 11/1923 | Clark et al. | |
| RE20,995 E | 2/1939 | Beasley | |
| 2,434,363 A | 1/1948 | Lenox | |
| 2,502,496 A | 4/1950 | Wickman | |
| 2,521,226 A | 9/1950 | Keller | |
| 2,727,703 A | 12/1955 | Bonnett | |
| 3,091,433 A | 5/1963 | Riley | |
| 3,131,729 A | 5/1964 | Rudolf et al. | |
| 3,657,491 A | 4/1972 | Ryder et al. | |
| 3,667,417 A | 6/1972 | Clinkenbeard | |
| 3,920,308 A | 11/1975 | Murray | |

(Continued)

FOREIGN PATENT DOCUMENTS

DE 42 26 368 A1 2/1994

(Continued)

OTHER PUBLICATIONS

International Search Report and Written Opinion mailed Mar. 18, 2009.

(Continued)

*Primary Examiner*—Jennifer Doan
(74) *Attorney, Agent, or Firm*—Merchant & Gould P.C.

(57) ABSTRACT

A fiber optic enclosure includes a housing and a cable spool assembly disposed on an exterior surface of the housing. The cable spool assembly has a first tear-away end and a second tear-away end. The first and second tear-away ends include at least one area of weakness extending from an inner diameter of the cable spool assembly to an outer diameter of the cable spool assembly. A mounting plate is rotationally engaged with the cable spool assembly such that the cable spool assembly and the housing selectively and unitarily rotate about an axis of the mounting plate.

30 Claims, 11 Drawing Sheets

U.S. PATENT DOCUMENTS

| | | |
|---|---|---|
| 3,940,086 A | 2/1976 | Stoquelet |
| 4,053,118 A | 10/1977 | Aikins |
| 4,081,258 A | 3/1978 | Goell et al. |
| 4,282,954 A | 8/1981 | Hill |
| 4,384,688 A | 5/1983 | Smith |
| 4,587,801 A | 5/1986 | Missout et al. |
| 4,635,875 A | 1/1987 | Apple |
| 4,657,140 A | 4/1987 | Zagar et al. |
| 4,666,237 A | 5/1987 | Mallinson |
| 4,669,705 A | 6/1987 | Langston |
| 4,767,073 A | 8/1988 | Malzacher |
| 4,846,343 A | 7/1989 | Rupert |
| 4,869,437 A | 9/1989 | Berz |
| 4,880,182 A | 11/1989 | Gelfman |
| 4,883,337 A | 11/1989 | Dahlgren |
| 4,913,369 A | 4/1990 | Lia et al. |
| 4,938,432 A | 7/1990 | Kurt et al. |
| 4,939,798 A | 7/1990 | Last |
| 4,940,859 A | 7/1990 | Peterson |
| 5,013,121 A | 5/1991 | Anton et al. |
| 5,016,554 A | 5/1991 | Harris et al. |
| 5,066,256 A | 11/1991 | Ward, Sr. |
| 5,074,863 A | 12/1991 | Dines |
| 5,109,467 A | 4/1992 | Hogan et al. |
| 5,168,969 A | 12/1992 | Mayhew |
| 5,185,843 A | 2/1993 | Aberson et al. |
| 5,265,815 A | 11/1993 | Soyka et al. |
| 5,280,861 A | 1/1994 | Corriveau |
| 5,317,663 A | 5/1994 | Beard et al. |
| 5,323,479 A | 6/1994 | Allen |
| 5,335,874 A | 8/1994 | Shrum et al. |
| 5,388,781 A | 2/1995 | Sauber |
| 5,394,466 A | 2/1995 | Schneider et al. |
| 5,485,972 A * | 1/1996 | Mummery et al. ........... 242/386 |
| 5,494,446 A | 2/1996 | DeLucia et al. |
| 5,497,444 A | 3/1996 | Wheeler |
| 5,519,275 A | 5/1996 | Scott et al. |
| 5,520,346 A | 5/1996 | Hoban |
| 5,522,561 A | 6/1996 | Koyamatsu et al. |
| 5,529,186 A | 6/1996 | Bass |
| 5,544,836 A | 8/1996 | Pera |
| 5,551,545 A | 9/1996 | Gelfman |
| 5,638,481 A | 6/1997 | Arnett |
| 5,703,990 A | 12/1997 | Robertson et al. |
| 5,709,347 A | 1/1998 | Hoffmann et al. |
| 5,717,810 A | 2/1998 | Wheeler |
| 5,718,397 A | 2/1998 | Stevens |
| 5,749,148 A | 5/1998 | White et al. |
| 5,773,757 A | 6/1998 | Kenney et al. |
| 5,787,219 A | 7/1998 | Mueller et al. |
| 5,915,062 A | 6/1999 | Jackson et al. |
| 5,915,640 A | 6/1999 | Wagter et al. |
| 5,987,203 A | 11/1999 | Abel et al. |
| 5,992,787 A | 11/1999 | Burke |
| 6,087,587 A | 7/2000 | Gonzalez |
| 6,215,938 B1 * | 4/2001 | Reitmeier et al. ........... 385/135 |
| 6,220,413 B1 | 4/2001 | Walters et al. |
| 6,315,598 B1 | 11/2001 | Elliot et al. |
| 6,385,381 B1 | 5/2002 | Janus et al. |
| 6,494,396 B2 | 12/2002 | Sugata |
| 6,496,641 B1 | 12/2002 | Mahony |
| 6,503,097 B2 | 1/2003 | Archambault |
| 6,511,009 B1 | 1/2003 | Harrison et al. |
| 6,522,826 B2 | 2/2003 | Gregory |
| 6,554,221 B2 | 4/2003 | Hinds |
| 6,591,051 B2 | 7/2003 | Solheid et al. |
| 6,616,080 B1 | 9/2003 | Edwards et al. |
| 6,625,374 B2 | 9/2003 | Holman et al. |
| 6,640,041 B2 | 10/2003 | Ichinari et al. |
| 6,661,961 B1 | 12/2003 | Allen et al. |
| 6,669,129 B1 | 12/2003 | Shah |
| 6,711,339 B2 | 3/2004 | Puetz et al. |
| 6,721,484 B1 | 4/2004 | Blankenship et al. |
| 6,834,517 B1 | 12/2004 | Sheehy |
| 6,856,748 B1 | 2/2005 | Elkins, II et al. |
| 6,915,058 B2 | 7/2005 | Pons |
| 6,926,449 B1 | 8/2005 | Keenum et al. |
| 6,933,441 B2 | 8/2005 | Fuller et al. |
| 6,937,725 B2 | 8/2005 | Liao |
| 6,948,680 B2 | 9/2005 | Ganster |
| 6,997,410 B1 | 2/2006 | Huang |
| 7,000,863 B2 | 2/2006 | Bethea et al. |
| 7,011,538 B2 | 3/2006 | Chang |
| 7,016,590 B2 | 3/2006 | Tanaka et al. |
| 7,017,721 B1 | 3/2006 | Bradford et al. |
| 7,044,278 B2 | 5/2006 | Wayne |
| 7,220,144 B1 | 5/2007 | Elliot |
| 7,266,283 B2 | 9/2007 | Kline et al. |
| 7,315,681 B2 | 1/2008 | Kewitsch |
| 7,346,253 B2 | 3/2008 | Bloodworth et al. |
| 7,364,108 B2 | 4/2008 | Kim et al. |
| 7,369,739 B2 | 5/2008 | Kline et al. |
| 7,400,814 B1 | 7/2008 | Hendrickson et al. |
| 7,522,806 B2 | 4/2009 | Hendrickson et al. |
| 7,546,018 B2 | 6/2009 | Hendrickson et al. |
| 7,548,679 B2 | 6/2009 | Hirano et al. |
| 7,715,679 B2 | 5/2010 | Kowalczyk et al. |
| 2001/0048044 A1 | 12/2001 | Sugata |
| 2002/0023814 A1 | 2/2002 | Poutiatine |
| 2002/0164121 A1 | 11/2002 | Brennan et al. |
| 2002/0171002 A1 | 11/2002 | Kretsch et al. |
| 2003/0037480 A1 | 2/2003 | Davis |
| 2004/0170369 A1 | 9/2004 | Pons |
| 2004/0244430 A1 | 12/2004 | Sheehy |
| 2005/0213920 A1 | 9/2005 | Tanaka et al. |
| 2005/0247136 A1 | 11/2005 | Cross et al. |
| 2005/0258411 A1 | 11/2005 | Zeitler |
| 2006/0163403 A1 | 7/2006 | Dickson |
| 2006/0183362 A1 | 8/2006 | Mullaney et al. |
| 2006/0210230 A1 | 9/2006 | Kline et al. |
| 2007/0025675 A1 | 2/2007 | Kramer |
| 2007/0165995 A1 | 7/2007 | Reagan et al. |
| 2008/0035778 A1 | 2/2008 | Belden et al. |
| 2008/0037945 A1 | 2/2008 | Gniadek et al. |
| 2008/0315030 A1 | 12/2008 | Hendrickson et al. |
| 2009/0074370 A1 | 3/2009 | Kowalczyk et al. |

FOREIGN PATENT DOCUMENTS

| | | |
|---|---|---|
| EP | 1 107 031 A1 | 6/2001 |
| FR | 2 566 997 A1 | 1/1986 |
| JP | 9-236709 | 9/1997 |
| JP | 11-349230 | 12/1999 |
| JP | 2003-114339 | 4/2003 |
| JP | 2005-73365 | 3/2005 |
| JP | 2005-249858 | 9/2005 |

OTHER PUBLICATIONS

7 Inch Modules, ADC Telecommunications, Inc, © 1998, "7 Inch Connector Module with IFC", pp. 127.

F3DF Modules, ADC Telecommunications, Inc. © 1995, "Individual 12-Pack Assemblies", pp. 90.

Fiber Distribution Frame, Pre-Terminated Rear Load Connector Module, Installation Instructions, ADC Telecommunications, Inc., © 2000.

Fiber Main Distribution Frame (FMDF), Fiber Terminal Block, Installation Instructions, ADC Telecommunications, Inc., © 2001.

Fiber Panel Products—Cable Management Tray Panels, ADC Telecommunications, Inc., © 1994, 1996 "72 Fiber Distribution Module (FDM) with Intrafacility Fiber Cable", pp. 56.

FL2000 Products, ADC Telecommunications, Inc., © 1994, 1996.

FL2000 Products—Preconfigured Panels, ADC Telecommunications, Inc., © 2000 "Rack or Cabinet Mount Termination Panel with Multifiber Cable", pp. 13.

Next Generation Frame (NGF), Product Family Ordering Guide, ADC Telecommunications, Inc., © 1996, 1999, 2000, "Fiber Termination Blocks (FTB) Preterminated", pp. 8.

Next Generation Frame (NGF), Product Family Ordering Guide, ADC Telecommunications, Inc., © 1996, 1999, 2000.

Next Generation Frames—Fiber Termination Blocks, ADC Telecommunication, Inc., © 1998, "Fiber Termination Blocks (FTB) Preterminated" pp. 6.

IFC Style Frame Modules, ADC Telecommunication, Inc., © 1995, "Connector Module Equipped with IFC", pp. 27.

Description of Admitted Prior Art, 30 pages, mailed Oct. 27, 2009.

International Search Report and Written Opinion mailed Aug. 8, 2008.

International Search Report and Written Opinion mailed Nov. 18, 2008.

"V-Linx™ EZ-Spool Combiner", Furukawa Electric North America, Copyright© 2007.

"V-Linx™ EZ-Spool Terminal", Furukawa Electric North America, Copyright© 2007.

Fiber Cable Management Products, Third Edition, ADC Telecommunications, Inc., © 1995, 1998.

Fiber Panel Products, Second Edition, ADC Telecommunications, Inc., © 1994, 1996.

FL2000 Products, ADC Telecommunications, Inc., © 1994, 1996, "Rack Mount Panel with Intrafacility Fiber Cable", pp. 16.

Value-Added Module System, ADC Telecommunications, Inc., © 1993, 1194, 1998, "12-Pack Module Assemblies", pp. 30-31.

* cited by examiner

FIBER OPTIC ENCLOSURE WITH TEAR-AWAY SPOOL

CROSS-REFERENCE TO RELATED APPLICATION

This application claims the benefit of U.S. Provisional Patent Application Ser. No. 60/970,185, filed Sep. 5, 2007, which is hereby incorporated by reference in its entirety.

TECHNICAL FIELD

The present disclosure relates to fiber optic enclosures, and more particularly, to fiber optic enclosures with cable payout.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

SUMMARY

An aspect of the present disclosure relates to a fiber optic enclosure for enclosing fiber optic connections. The fiber optic enclosure includes a housing and a cable spool assembly disposed on an exterior surface of the housing. The cable spool assembly has a first tear-away end and a second tear-away end. The first and second tear-away ends include at least one area of weakness extending from an inner diameter of the cable spool assembly to an outer diameter of the cable spool assembly. A mounting plate is rotationally engaged with the cable spool assembly such that the cable spool assembly and the housing selectively and unitarily rotate about an axis of the mounting plate.

Another aspect of the present disclosure relates to a method of paying out a subscriber cable from a fiber optic enclosure. The method includes rotating a housing and a cable spool assembly, which includes a subscriber cable coiled around a drum portion of the cable spool assembly, about an axis of a mounting plate of the fiber optic enclosure until a desired length of subscriber cable is paid out. A tear-away end of the cable spool assembly is split at an area of weakness. The tear-away end of the cable spool assembly is removed from the cable spool assembly.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
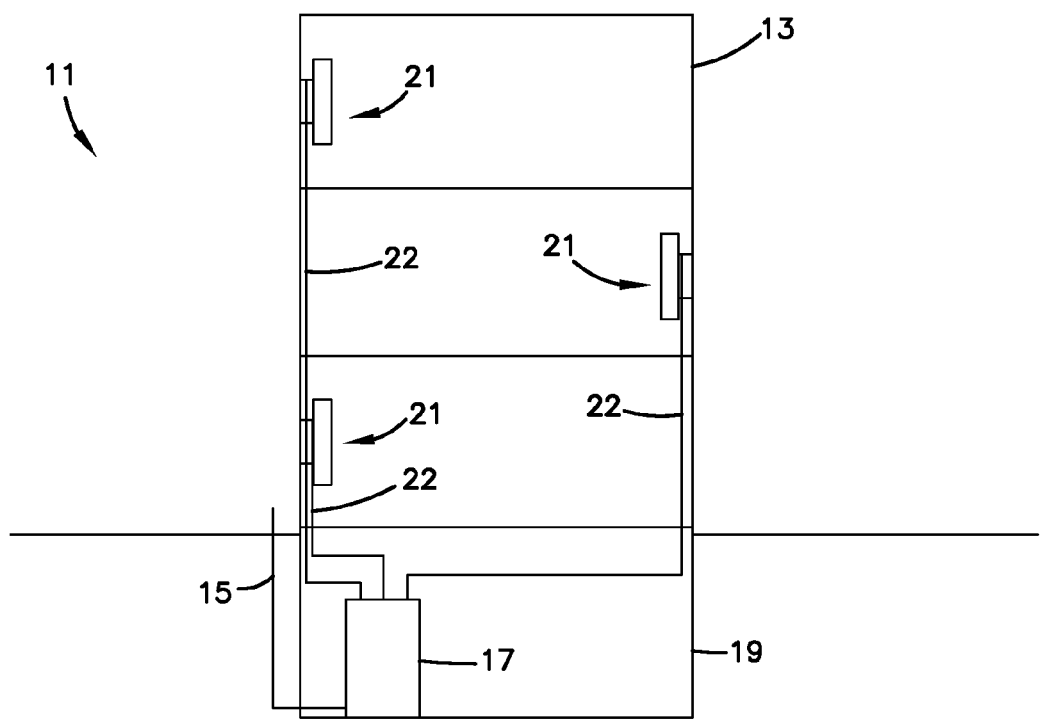
FIG. 1 is a schematic representation of a fiber optic network that includes a fiber optic enclosure having features that are examples of aspects in accordance with the principles of the present disclosure.

Referring now to FIG. 1, a schematic representation of a fiber optic network, generally designated 11, in a facility 13 (e.g. individual residence, apartment, condominium, business, etc.) is shown. The fiber optic network 11 includes a feeder cable 15 from a central office (not shown). The feeder cable 15 enters a feeder cable input location 17 (e.g., a fiber distribution hub, a network interface device, etc.) having one or more optical splitters (e.g., 1-to-8 splitters, 1-to-16 splitters, or 1-to-32 splitters) that generate a number of individual fibers. In the subject embodiment, and by way of example only, the fiber distribution hub 17 is located on a lower level 19 of the facility 13. Each unit in the facility 13 includes a fiber optic enclosure, generally designated 21, with a subscriber cable 22 extending from each of the fiber optic enclosures 21 to the fiber distribution hub 17. The subscriber cable 22 extending between the fiber distribution hub 17 and the fiber optic enclosure 21 typically includes multiple optical fibers.

Figure 2:
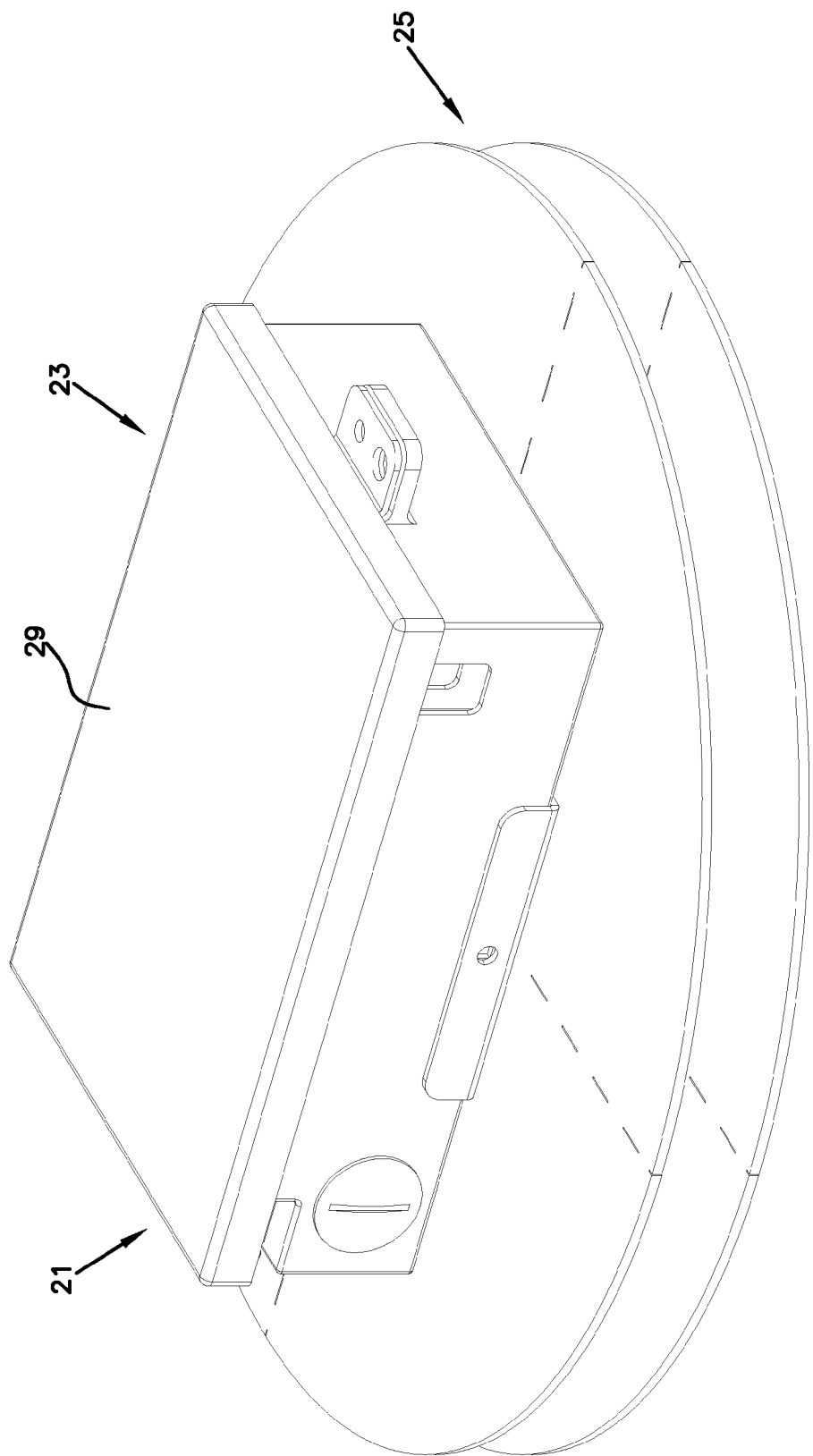
FIG. 2 is an isometric view of the fiber optic enclosure shown schematically in FIG. 1.
Figure 3:
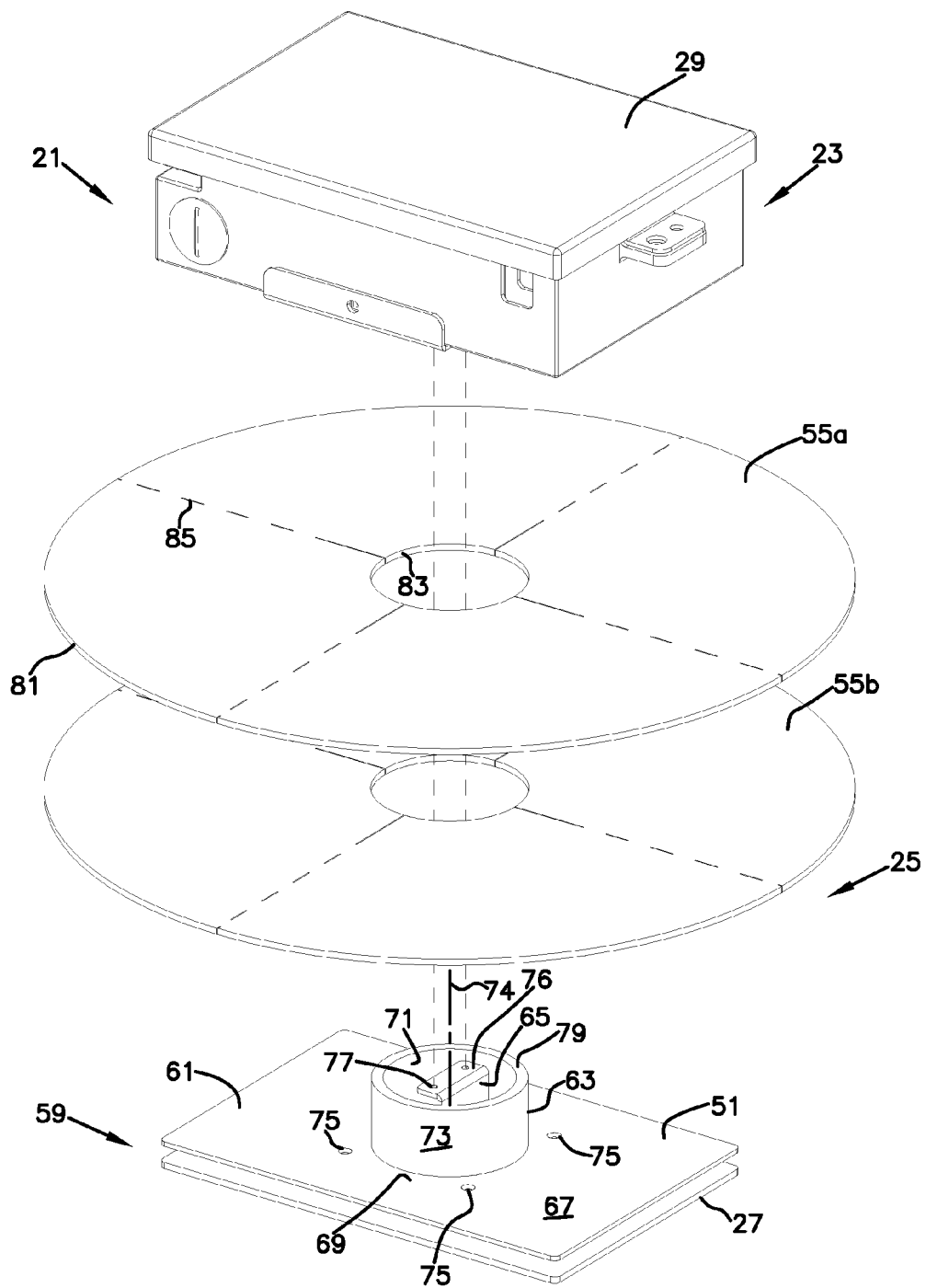
FIG. 3 is an exploded isometric view of the fiber optic enclosure of FIG. 2.

Referring now to FIGS. 2 and 3, the fiber optic enclosure 21 will now be described. The fiber optic enclosure 21 includes a housing, generally designated 23 a cable spool assembly, generally designated 25, and a mounting plate 27 (shown in FIG. 3).

Figure 4:
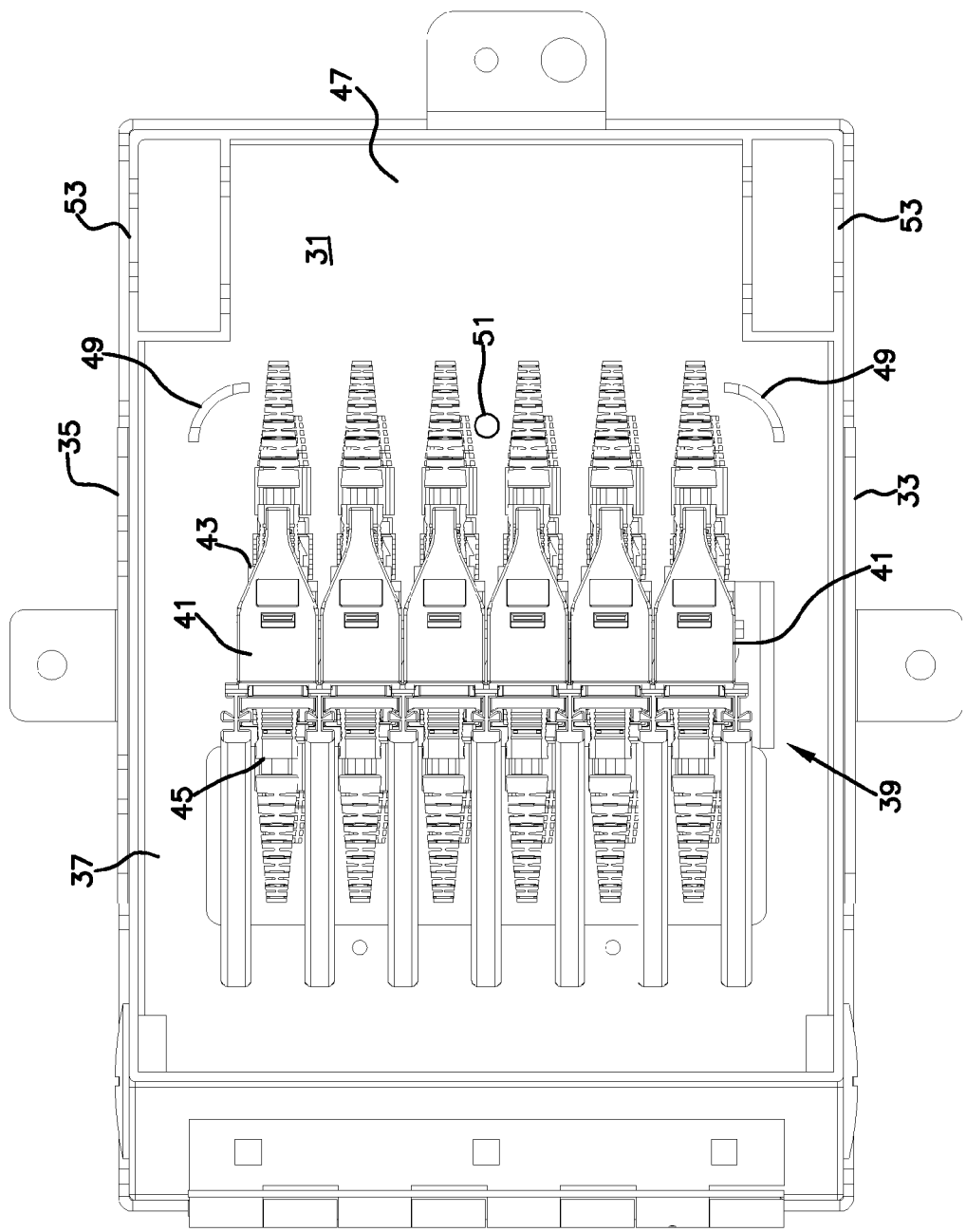
FIG. 4 front view of the fiber optic enclosure of FIG. 2 with a cover removed.

Referring now to FIG. 4, the housing 23 includes a cover 29 (shown in FIGS. 2 and 3), a base 31, a first sidewall 33, and an oppositely disposed second sidewall 35. The first and second sidewalls 33, 35 extend outwardly from the base 31 such that the base 31 and the first and second sidewalls 33, 35 cooperatively define an interior region 37.

A termination module, generally designated 39, is disposed in the interior region 37 of the housing 23. The termination module 39 of the fiber optic enclosure 21 serves as the dividing line between the incoming fibers and the outgoing fibers. In the subject embodiment, the termination module 39 is mounted to the base 31 of the housing 23.

In the subject embodiment, the termination module 39 includes a plurality of sliding adapter modules 41 having front sides 43 and back sides 45. Similar sliding adapter modules 41 have been described in detail in commonly owned U.S. Pat. Nos. 5,497,444; 5,717,810, 6,591,051 and U.S. Pat. Pub. No. 2007/0025675, the disclosures of which are incorporated herein by reference.

In the subject embodiment, the interior region 37 of the housing 23 includes a slack storage area 47 in which are disposed cable management tabs 49. The cable management tabs 49 are disposed in the interior region 37 of the housing 23 to provide organization of the incoming and outgoing cable within the interior region 37 and to avoid attenuation damage to the optical fibers during storage.

The interior region 37 includes a passage 51 that extends through the through the base 31 of the housing 23. The passage 51 allows the connectorized ends of the subscriber cable 22 to pass into the housing 23. As incoming optical fibers pass through the passage 51, the incoming optical fibers are routed to the slack storage area 47. Connectorized ends of the incoming optical fibers are then routed from the slack storage area 47 to the front sides 43 of the sliding adapter modules 41. Connectorized ends of outgoing optical fibers are routed from the back sides 45 of the sliding adapter modules 41 and through fiber exit ports 53 which are disposed in the first and second sidewalls 33, 35.

Referring now to FIG. 3, the cable spool assembly 25 is disposed on an exterior surface of the housing 23. In the subject embodiment, the cable spool assembly 25 is disposed on the back side of the base 31, although it will be understood that the scope of the present disclosure is not limited to the cable spool assembly 25 being disposed on the back side of the base 31. The cable spool assembly 25 includes a first tear-away end 55a, an oppositely disposed second tear-away end 55b, and a drum plate assembly, generally designated 59.

The drum plate assembly 59 includes a plate portion 61, a drum portion 63, and a mounting bracket 65. In the subject embodiment, the plate portion 51 includes a generally planar surface 67 having a perimeter that is generally rectangular in shape. It will be understood, however, that the scope of the present disclosure is not limited to the plate portion 51 having a generally planar surface 67 that is generally rectangular in shape.

The drum portion 63 extends outwardly from the planar surface 67 of the plate portion 61 in a generally perpendicular direction. In the subject embodiment, the drum portion 63 extends outwardly from a center portion 69 of the plate portion 61, although it will be understood that the scope of the present disclosure is not limited to the drum portion 63 extending outwardly from the center portion 69 of the plate portion 61. The drum portion 63 is generally cylindrical in shape having an internal bore 71 and an outer surface 73. The internal bore 71 extends through the drum portion 63 and defines a central axis 74 of the drum plate assembly 59.

In the subject embodiment, the mounting bracket 65 is rigidly engaged to the plate portion 61 of the drum plate assembly 59 by a plurality of fasteners (e.g., bolts, screws, rivets, etc.), which extend through a plurality of mounting holes 75 in the plate portion 61 and through a plurality of mounting apertures, which are aligned with the mounting holes 75, in the mounting bracket 65. When mounted to the plate portion 61, the mounting bracket 65 extends outwardly from the planar surface 67 of the plate portion 61 in a generally perpendicular direction such that the mounting bracket 65 extends through the internal bore 71 of the drum portion 63.

The mounting bracket 65 includes a mounting face 76 having a plurality of holes 77 for rigid engagement to the housing 23. In one embodiment, the holes 77 are thru-holes for fasteners such as rivets or bolts. In another embodiment, the holes 77 are threaded holes for threaded fasteners such as screws. In the subject embodiment, the mounting face 76 of the mounting bracket 65 extends slightly farther outwardly than an end surface 79 of the drum portion 63.

The plate portion 61 of the drum plate assembly 59 is connectedly engaged to the mounting plate 27 through a bearing, such as a lazy-susan bearing or a ball bearing. A central axis of the bearing is aligned with the center axis 74 of the drum portion 63 of the drum plate assembly 59. The bearing allows the drum plate assembly 59 to rotate about the central axis of the bearing, which is aligned with the center axis 74 of the internal bore 71, and the mounting plate 27 when the mounting plate 27 is fixed to a structure such as a wall.

Figure 5:
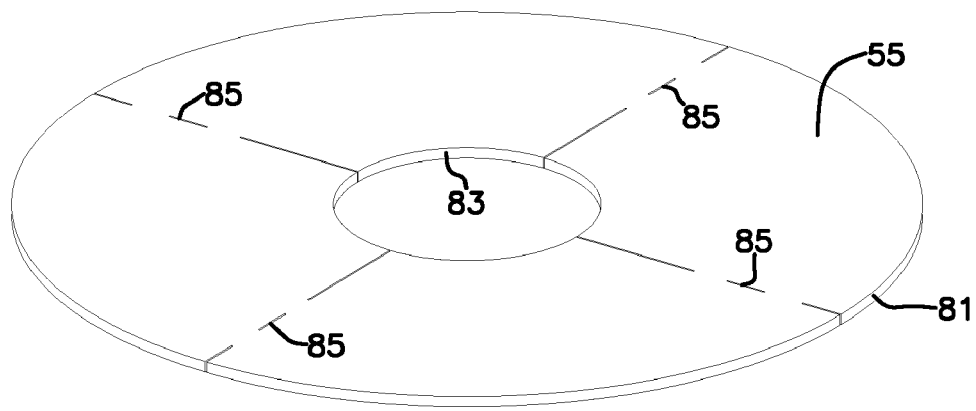
FIG. 5 is an isometric view of a tear-away end of a cable spool assembly of the fiber optic enclosure of FIG. 2.
Figure 6:
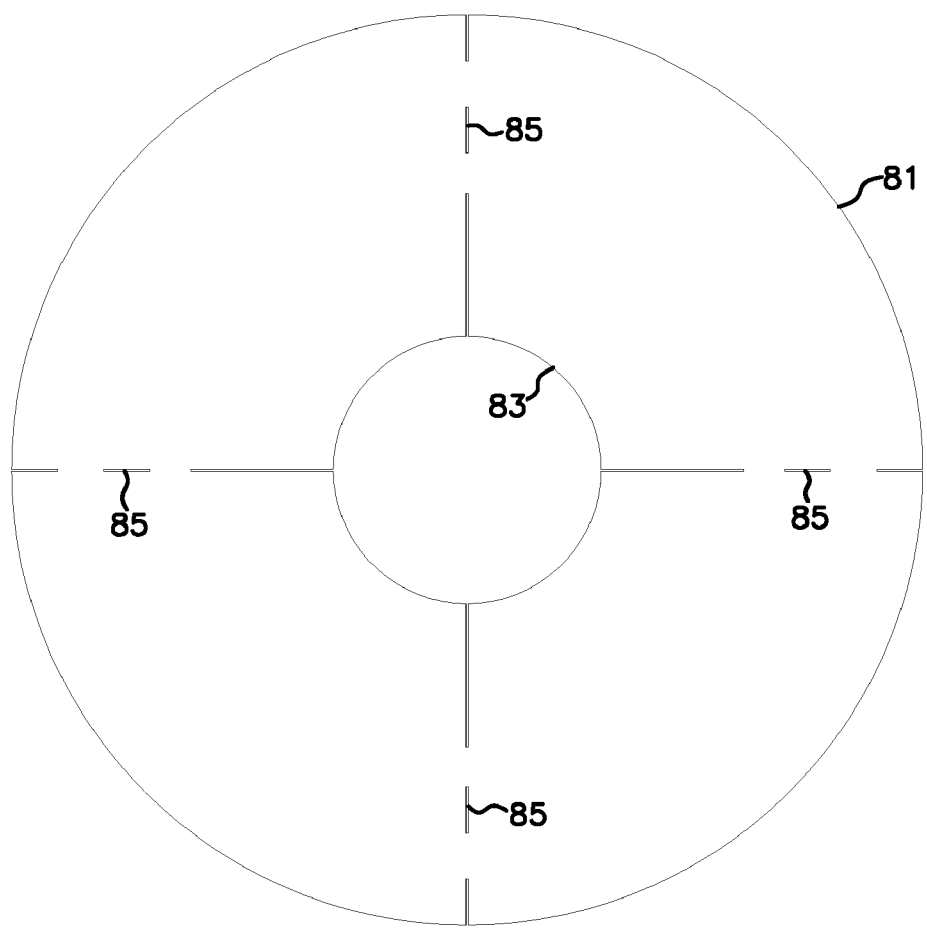
FIG. 6 is a front view of the tear-away end of FIG. 5.

Referring now to FIGS. 3, 5 and 6, the first and second tear-away ends 55a, 55b of the cable spool assembly 25 will be described. In the subject embodiment, the first and second tear-away ends 55a, 55b are generally similar in structure. Therefore, for ease of description, the first and second tear-away ends 55a, 55b will be commonly referred to as "the tear-away end 55". It will be understood, however, that the scope of the present disclosure is not limited to the first and second tear-away ends 55a, 55b being similar.

The tear-away end 55 is generally circular in shape and includes an outside diameter 81 and an inner diameter 83. The inner diameter 83 is adapted to receive the outer surface 73 of the drum portion 63. The tear-away end 55 includes at least one area of weakness 85. In the subject embodiment, the area of weakness 85 radially extends from the inner diameter 83 of the tear-away end 55 to the outer diameter 81. In one embodiment, and by way of example only, there are four areas of weakness 85 dispose on the tear-away end 55 that radially extend from the inner diameter 83 to the outer diameter 81. The four areas of weakness 85 are incrementally disposed on the tear-away end 55 so as to be 90 degrees from the adjacent area of weakness 85. In the subject embodiment, the area of weakness 85 is a perforation formed by a series of slits that extend through the tear-away end 55 with a slit disposed at the outer diameter 81 of the tear-away end 55 to serve as a point at which tearing can be initiated. In another embodiment, the area of weakness 85 is an area of reduced thickness.

In the subject embodiment, the tear-away end 55 is manufactured from a plastic material such as acrylonitrile butadiene styrene (ABS) having a thickness of 0.09 inches. It will be understood, however, that the scope of the present disclosure is not limited to the tear-away end 55 being made from ABS or to the tear-away end 55 having a thickness of 0.09 inches as the tear-away end 55 could be made from other materials including but not limited to cardboard of various thicknesses. In the embodiment in which the area of weakness 85 is an area of reduced thickness, the thickness of the area of weakness 85 is less than one-half of the thickness of the tear-away end 55. In another embodiment, the thickness of the area of weakness 85 is less than one-third of the thickness of the tear-away end 55. In yet another embodiment, the thickness of the area of weakness 85 is less than one-quarter (¼) of the thickness of the tear-away end 55. In one embodiment, the thickness of the area of weakness 85 is about 0.015 inches. In the embodiments in which the area of weakness is an area of reduced thickness, a slit is disposed at the outer diameter 81 of the tear-away end 55 to serve as a point at which tearing can be initiated.

The first and second tear-away ends 55a, 55b are oppositely disposed on the outer surface 73 of the drum portion 63. In the subject embodiment, the first and second tear-away ends 55a, 55b are in close fit engagement with the outer surface 73 such that the first and second tear-away ends 55a, 55b may rotate slightly. In one embodiment, the first and second tear-away ends 55a, 55b are in tight fit engagement with the outer surface 73 of the drum portion 63. The first and second tear-away ends 55a, 55b are oriented along the drum portion 63 such that a portion of the outer surface 73 of the drum portion 63 is disposed between the first and second tear-away ends 55a, 55b so that a length of the subscriber cable 22, having multiple optical fibers, can be coiled around the portion of the outer surface 73 between the first and second tear-away ends 55a, 55b. In order to protect the subscriber cable 22 from attenuation resulting from coiling of the subscriber cable 22 around the drum portion 63, the outer surface 73 has a radius that is greater than the minimum bend radius of the subscriber cable 22.

The subscriber cable 22 includes a first end and a second end. The first end of the subscriber cable 22 has connectorized ends, which are inserted through the passage 51 and connectedly engaged with the front sides 43 of the sliding adapter modules 41. The second end of the subscriber cable 22 is configured for connectivity with the fiber distribution hub 17. However, as shown in FIG. 1, the length of subscriber cable 22 needed between each of the fiber optic enclosures 21 in the facility 13 and the fiber distribution hub 17 will vary depending upon the location of each fiber optic enclosure 21 with respect to the fiber distribution hub 17.

A method of installing and using the fiber optic enclosure 21 to account for the varying lengths of subscriber cable 22 needed between the fiber optic enclosure 21 and the fiber distribution hub 17 will now be described. The fiber optic enclosure 21 provides dual functionality by serving as a storage location for the subscriber cable 22 and by selectively paying out a desired length of the subscriber cable 22. A given length of subscriber cable 22 is stored in the fiber optic enclosure 21 by coiling the length of subscriber cable 22 around the cable spool assembly 25. In one embodiment, the length of subscriber cable 22, which is coiled around the cable spool assembly 25, is in the range of 100 to 500 feet. In another embodiment, the length of subscriber cable 22 coiled around the cable spool assembly 25 is 300 feet. With the cable spool assembly 25 disposed on the exterior surface of the housing 23, the fiber optic enclosure 21 with the cable spool assembly 25 can provide more effective cable management for a greater length of subscriber cable 22 than a fiber optic enclosure 21 without the cable spool assembly 25.

The second function of the fiber optic enclosure 21 involves the selective payout of the subscriber cable 22. As previously mentioned, the first end of the subscriber cable 22 is in connected engagement with the termination module 39, which is disposed in the interior region 37 of the housing 23. With the first end of the subscriber cable 22 in connected engagement with the front sides 43 of the sliding adapter modules 41 and the outgoing optical fibers disengaged from the back sides 45 of the sliding adapter modules 41, the subscriber cable 22 can be paid out. As the cable spool assembly 25 is rigidly engaged with the housing 23 through the mounting face 76 of the mounting bracket 65 and rotationally engaged with the mounting plate 27 through the bearing disposed between the mounting plate 27 and the plate portion 61 of the drum plate assembly 59 of the cable spool assembly 25, the cable spool assembly 25 and housing 23 can selectively rotate about the central axis of the bearing, which is aligned with the center axis 74 of the internal bore 71 of the drum portion. Therefore, with the cable spool assembly 25 rigidly mounted to the housing 23 and rotationally mounted to the mounting plate 27, which is mounted to a wall, the desired length of the subscriber cable 22 can be paid out from the fiber optic enclosure 21 by rotating the fiber optic enclosure 21 in a rotational direction about the center axis 74. Since the housing 23 and the cable spool assembly 25 rotate unitarily about the central axis 74, the second end of the subscriber cable 22 can be paid out without the first end of the subscriber cable 22 being pulled out of the termination module 39.

Once the desired length of subscriber cable 22 has been paid out, the rotation of the fiber optic enclosure 21 is ceased. At this point, the tear-away ends 55 of the cable spool assembly 25 can be removed. To remove the tear-away ends 55 of the cable spool assembly 25, the area of weakness 85 that extends from the inner diameter 83 to the outer diameter 81 is split. In the subject embodiment, the area of weakness 85 can be split by breaking, tearing, cutting, ripping, etc. The area of weakness 85 is split along the length of the area of weakness 85. When the split reaches the inner diameter 83 of the tear-away ends 55, the opening created by splitting the area of weakness 85 can be expanded so that the tear-away ends 55 can be removed from the cable spool assembly 25. In another embodiment, other areas of weakness 85 can be split to create an opening between the areas of weakness 85, through which the drum portion 63 of the cable spool assembly 25 can be passed.

Figure 7:
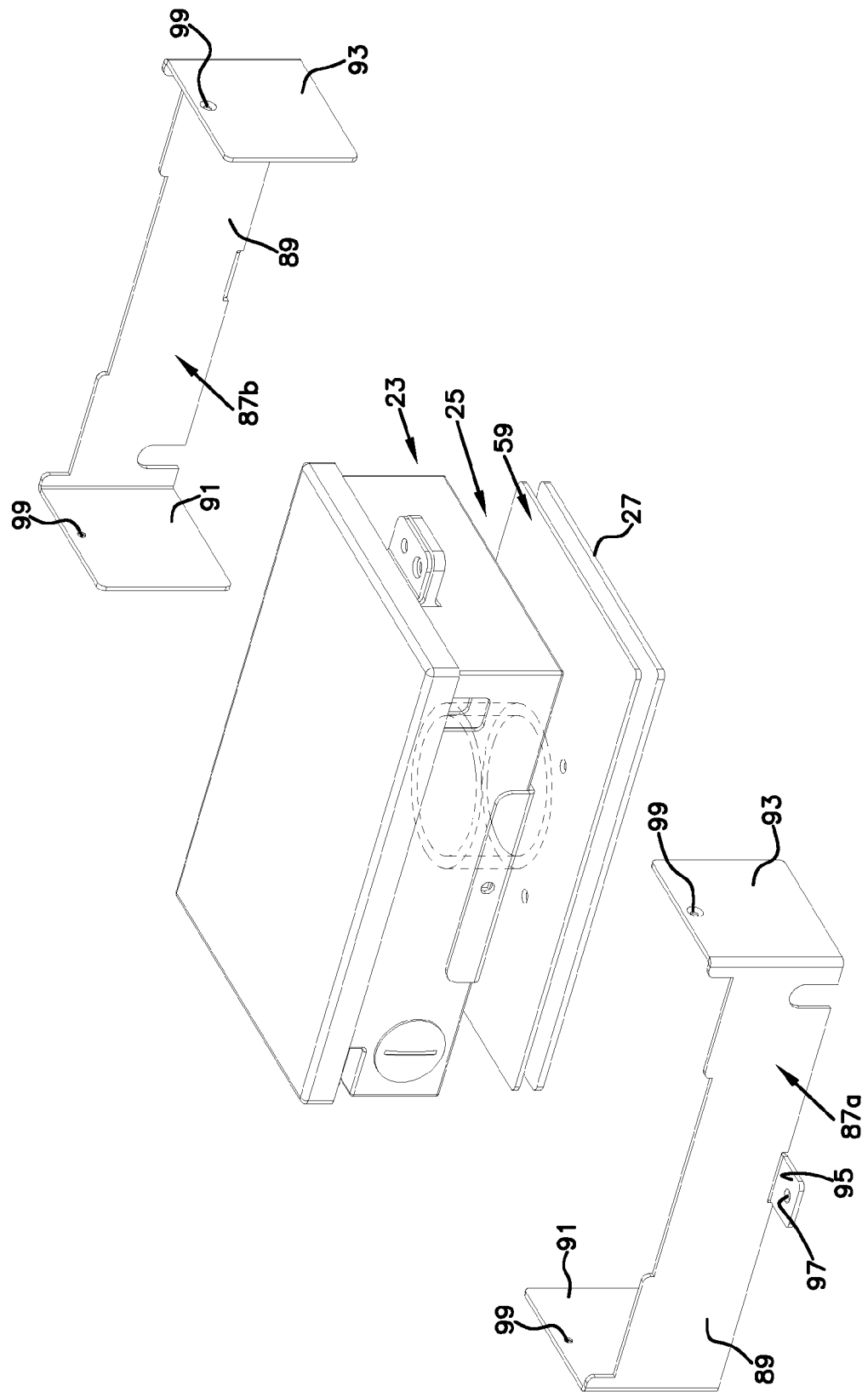
FIG. 7 is an exploded isometric view of the fiber optic enclosure of FIG. 2 with a bracket.
Figure 8:
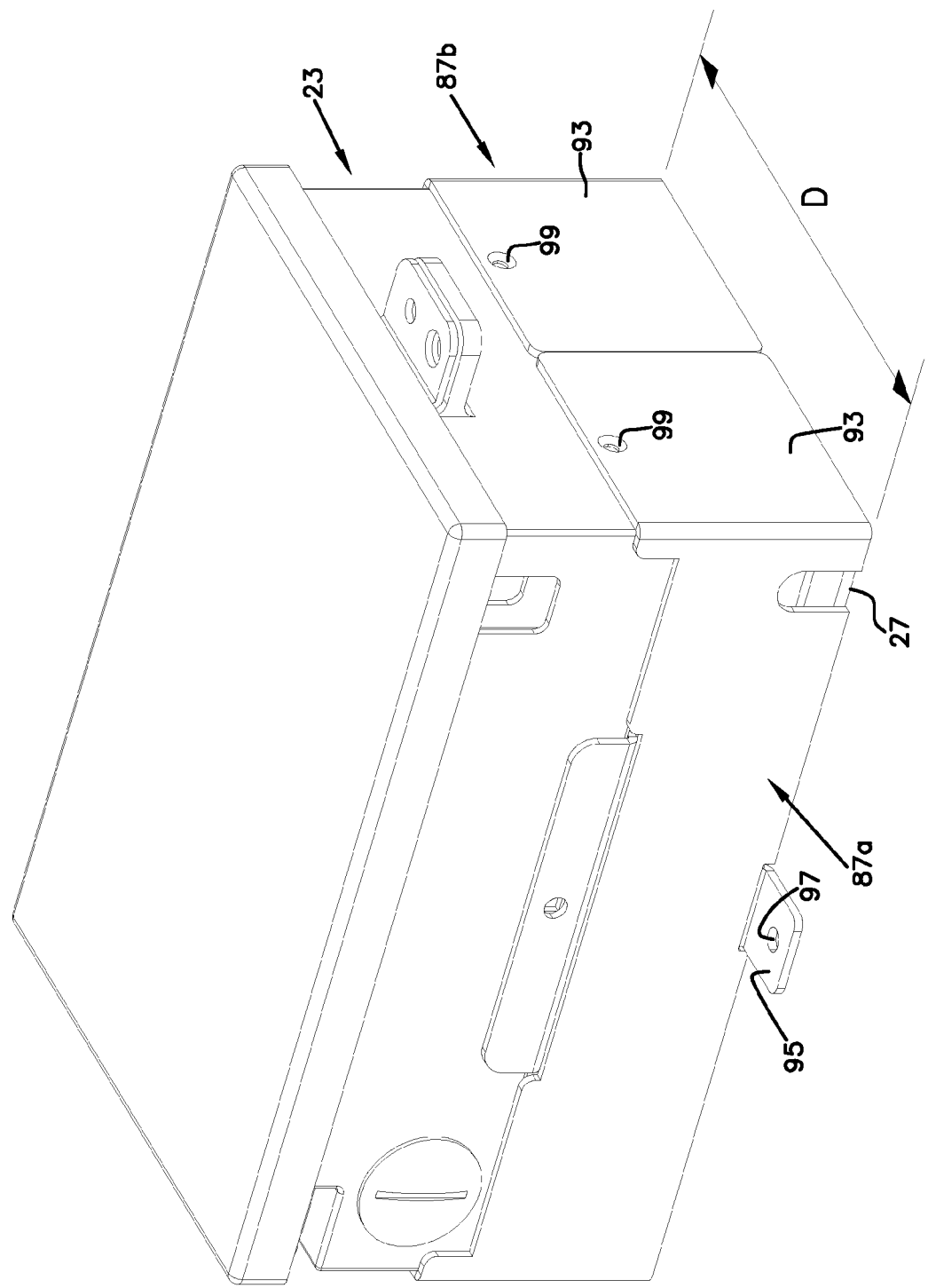
FIG. 8 is an isometric view of the fiber optic enclosure of FIG. 7.

Referring now to FIGS. 7 and 8, with the tear-away ends 55 of the cable spool assembly 25 removed, the position of the fiber optic enclosure 21 can be fixed such that it does not rotate relative to the mounting plate 27. A first bracket, generally designated 87a, and a second bracket, generally designated 87b, can be used to secure the position of the fiber optic enclosure 21 after the rotation of the fiber optic enclosure 21 has ceased. In the subject embodiment, the first and second brackets 87a, 87b are generally similar in structure. Therefore, for ease of description, the first and second brackets 87a, 87b will be commonly referred to as "the bracket 87". It will be understood, however, that the scope of the present disclosure is not limited to the first and second brackets 87a, 87b being similar.

In the subject embodiment, the bracket 87 is U-shaped having a front plate 89, a left plate 91, and a right plate 93. It will be understood, however, that the scope of the present disclosure is not limited to the bracket 87 being U-shaped. In the subject embodiment, a mounting tab 95 extends in a generally perpendicular direction to the front plate 89. The mounting tab 95 includes a thru-hole 97 for mounting the bracket 87 to a wall. In the subject embodiment, the left and right plates 91, 93 include mounting openings 99 for mounting the left and right plates 91, 93 to the housing 23. As the bracket 87 is mounted to the wall or other structure and extends between the mounting plate 27 and the housing 23, the housing 23 is no longer able to selectively rotate relative to the mounting plate 27 since it is restricted by the engagement with the bracket 87.

In order to prevent rotation of the housing 23 relative to the mounting plate 27 and to protect the subscriber cable 22 stored on the drum portion 63 of the cable assembly 25 from environmental damage, the first and second brackets 87a, 87b are installed on the opposite sides of the housing 23 such that the left and right plates 91, 93 of the first bracket 87a and the left and right plates 91, 93 of the second bracket 87b each extend about half of the depth D (shown in FIG. 8) of the housing 23.

The areas of weakness 85 may be advantageous for making a more compact fiber optic enclosure 21 after the fiber optic enclosure 21 has been mounted to a wall or structure and after the subscriber cable 22 has been paid out from the fiber optic enclosure 21. While the cable spool assembly 25 provides for storage of the subscriber cable 22 during shipping and handling and cable management during pay out of the subscriber cable 22, the outer diameter 81 of the cable spool assembly 25 may not be required after the subscriber cable 22 is paid out. The tear-away ends 55 allow for the overall size of the cable spool assembly 25 to be reduced following payout.

Figure 9:
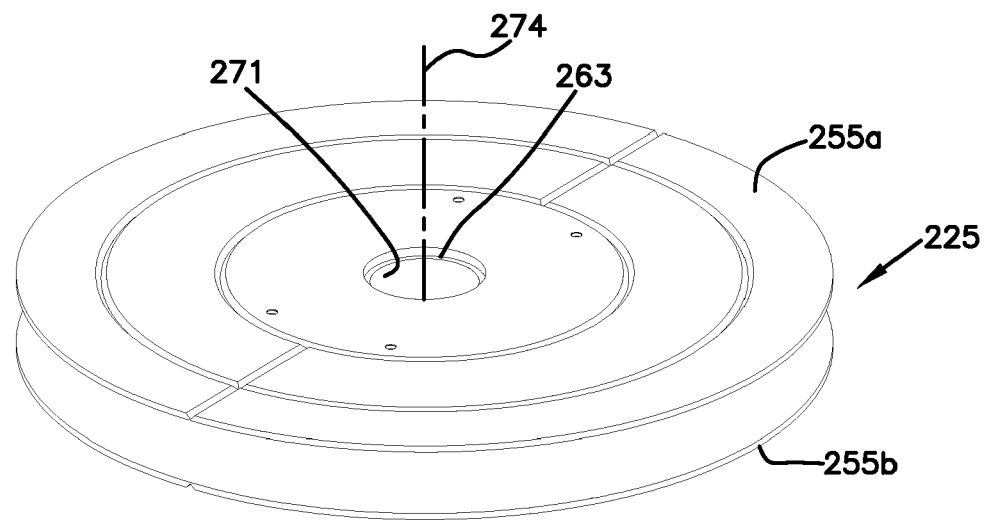
FIG. 9 is an alternate embodiment of a cable spool assembly having features that are examples of aspects in accordance with the principles of the present disclosure.
Figure 10:
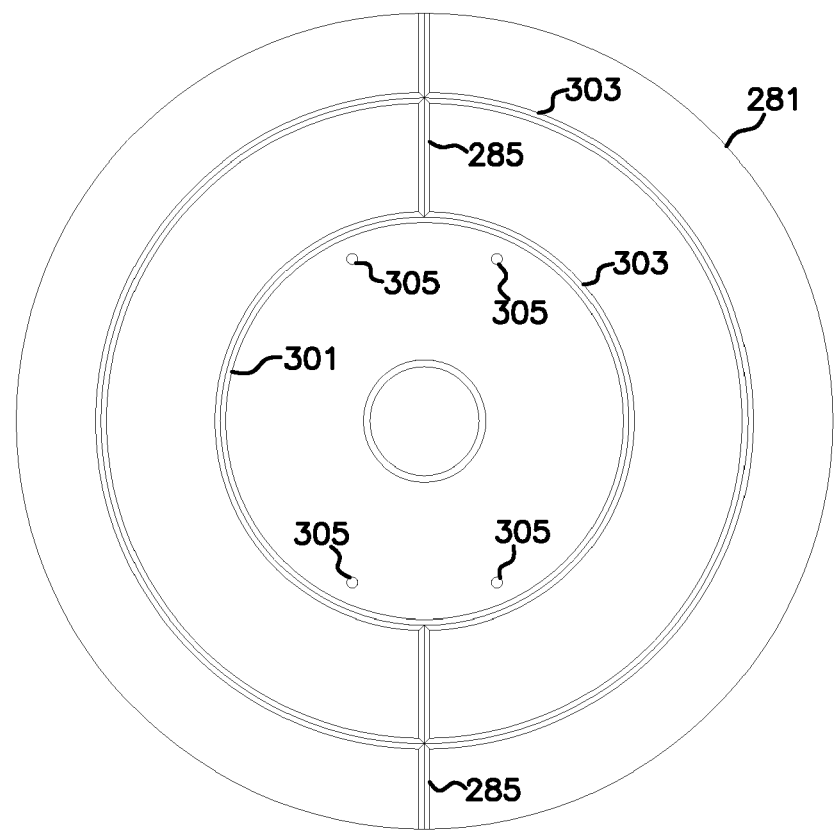
FIG. 10 is a front view of the cable spool assembly of FIG. 9

Referring now to FIGS. 9 and 10, an alternate embodiment of a cable spool assembly 225 is shown. The cable spool assembly 225 includes a first tear-away end 255a and a second tear-away end 255b. The tear-away ends 255 are oppositely disposed on a drum portion 263. In the subject embodiment, the tear-away ends 255 are connected (e.g., press-fit, bonded, soldered, etc.) to the drum portion 263. The drum portion 263 is cylindrically shaped and includes an internal bore 271 and an outer surface. The internal bore 271 extends through the drum portion 263 and defines a central axis 274.

The tear-away end 255 is generally circular in shape and includes an outside diameter 281. The tear-away end 255 also includes at least one radial area of weakness 85. In the subject embodiment, the area of weakness 285 radially extends from the outside diameter 281 of the tear-away end 255 to an inner diameter 301. In the subject embodiment, at least one circular area of weakness 303 is also included in the tear-away end 255. The circular area of weakness 303 extends around the tear-away end 255 and has a radius that is less than the radius of the outer diameter 281. In the subject embodiment, and by way of example only, there are two radial areas of weakness 285 dispose on the tear-away end 55 that radially extend from the inner diameter 301 to the outer diameter 281 and there are two circular areas of weakness 303, with one of the two circular areas of weakness being disposed at the inner diameter 301. In the subject embodiment, the two radial areas of weakness 285 are disposed so as to be 180 degrees apart while the two circular areas of weakness 303 are concentric. In the subject embodiment, the radial and circular areas of weakness 285, 301 are areas of reduced thickness.

The first tear-away end 255a includes a plurality of apertures 305. The apertures 305 are disposed in the first tear-away end 255a for rigidly engaging the cable spool assembly 225 to the back side of the base 31 of the housing 23. The apertures 305 would align with holes in the base 31 of the housing 23 and would allow the first tear-away end 255a to be fastened to the housing 23 with fasteners such as screws, bolts, rivets, etc.

Figure 11:
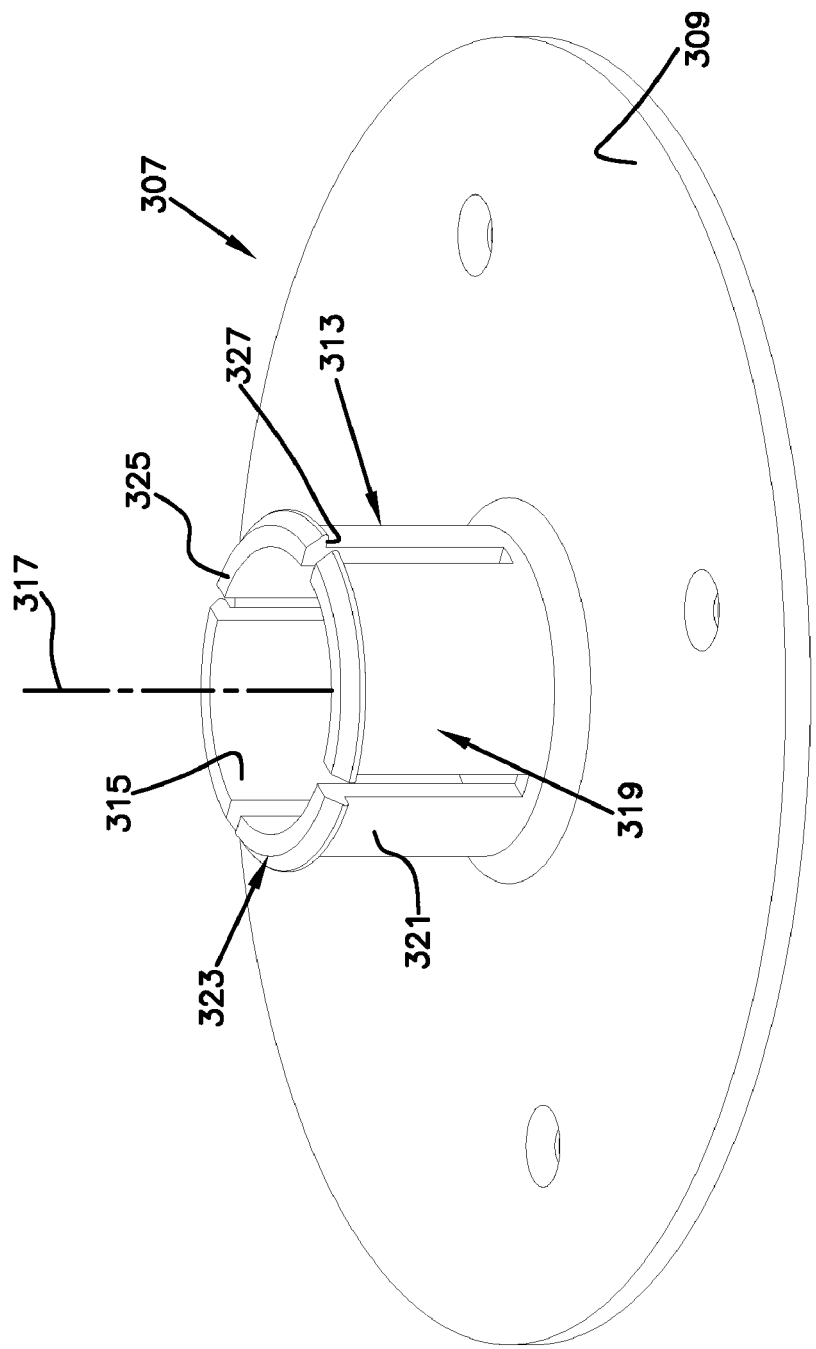
FIG. 11 is an isometric view of a spindle assembly suitable for use with the cable spool assembly of FIG. 9.
Figure 12:
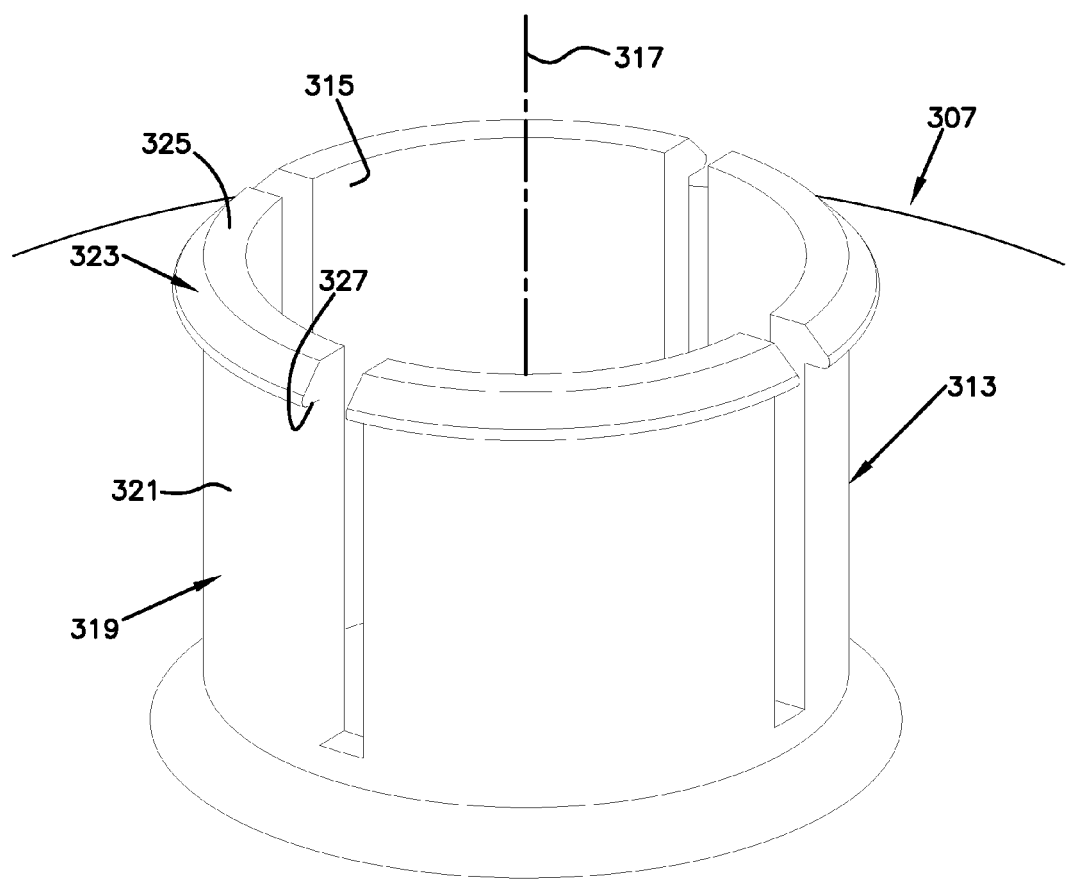
FIG. 12 is an enlarged, fragmentary, isometric view of the spindle assembly of FIG. 11.
Figure 13:
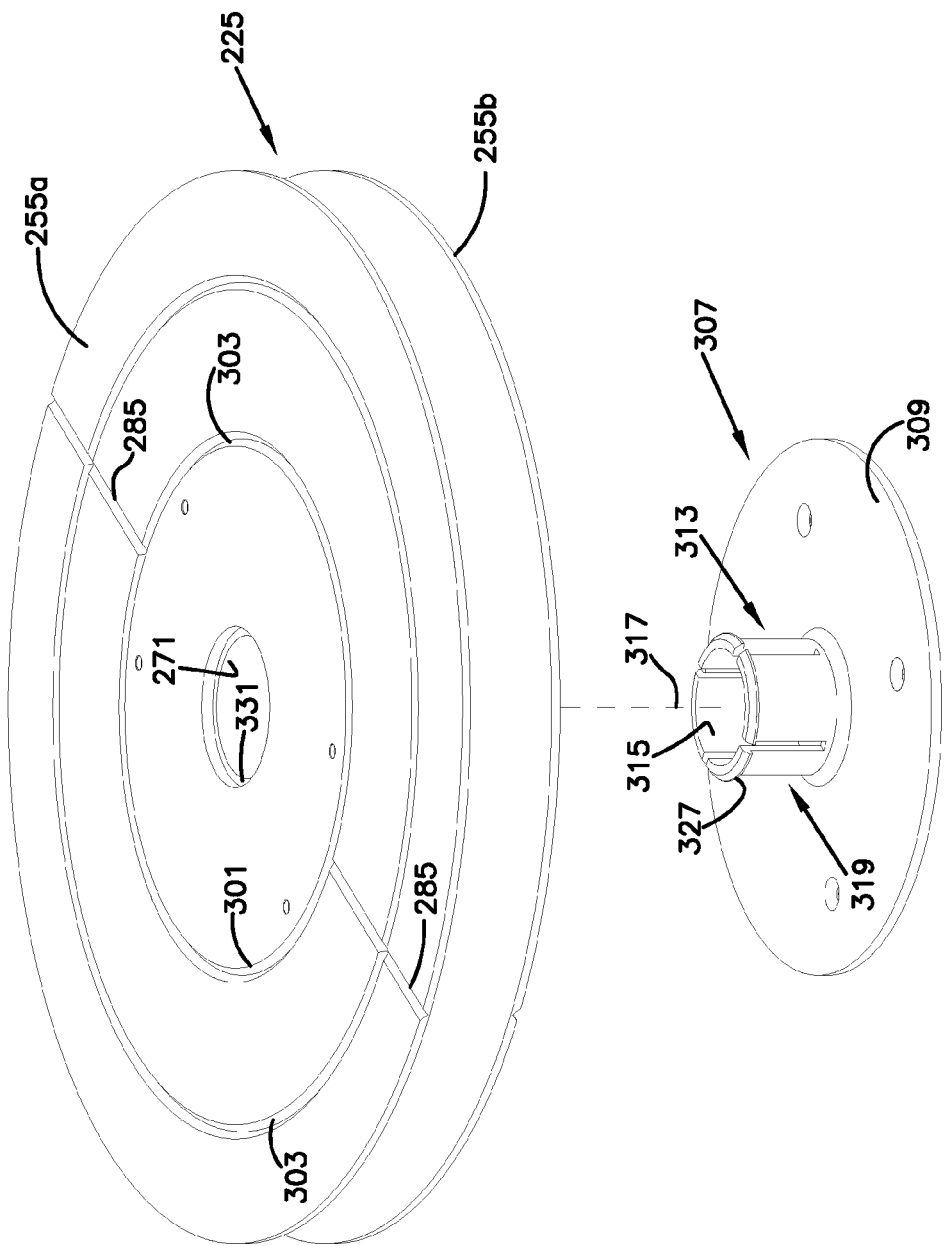
FIG. 13 is an exploded isometric view of the cable spool assembly of FIG. 9 and the spindle assembly of FIG. 11.

Referring now to FIGS. 11 and 12, a spindle assembly, generally designated 307, will be described. The spindle assembly 307 includes a mounting plate 309 having a plurality of mounting thru-holes 311 for fastenedly engaging the mounting plate 309 to a wall or structure. The spindle assembly 307 also includes a spindle, generally designated 313, having a bore 315 with an axis 317. In the subject embodiment, the spindle is connected (e.g., fastened, bonded, soldered, etc.) to the mounting plate 309.

The spindle 313 also includes a plurality of resilient latches, generally designated 319. The resilient latches 319 extend outwardly from the mounting plate 309. The resilient latches 319 include a free end 321 and a latch portion, generally designated 323. The latch portion 323 includes an end surface 325 and a radially outwardly facing lip 327. The lip 327 extends outwardly in a direction that is generally perpendicular to the axis 317. A chamfered edge 329 is disposed between the end surface 325 and the lip 327.

Referring now to FIGS. 9-13, the internal bore 271 of the drum portion 263 of the cable spool assembly 225 is adapted for receiving the spindle 313. In the subject embodiment, the internal bore 271 and the drum portion 263 are in snap fit engagement with the spindle 313. With the spindle assembly 307 mounted to a wall or structure, the central axis 274 of the internal bore 271 of the cable spool assembly 225 is aligned with the axis 317 of the bore 315 of the spindle 313. The cable spool assembly 225 is then pressed onto the spindle 313 such that contact between the cable spool assembly 225 and the chamfered edge 329 of the spindle 313 causes the resilient latches 319 to flex toward the axis 317 until the internal bore 271 of the drum portion 263 fits around the spindle 313. When the cable spool assembly 225 is fully engaged on the spindle 313, the resilient latches 319 spring back thereby engaging an edge 331 of the drum portion 263 with the lip 327 of each of the resilient latches 319 of the spindle 313. With the spindle 313 engaged with cable spool assembly 225, the cable spool assembly 225 and the housing 23 can selectively slidingly rotate about the spindle 313 of the spindle assembly 307, which is rigidly mounted to the wall or structure.

The circular area of weakness 301 may be advantageous as it allows for the tear-away ends 255 of the cable spool assemblies 225 to be scalable. If the fiber optic enclosure 21 is requested with a less amount of subscriber cable 22, the outer diameter 281 of the cable spool assembly 225 can be adjusted by tearing off part of the tear-away ends 255 at the circular area of weakness 301.

In addition, the circular area of weakness 301 may be advantageous as it allows for only one part number to be cataloged. In a scenario where cable spool assemblies 225 having different outer diameters 281 are required, a cable spool assembly 225 having a first outer diameter 281 can be modified to a cable spool assembly 225 having a second outer diameter 281 by tearing off part of the tear-away ends 255 at the circular area of weakness 301.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A fiber optic enclosure for enclosing optical fiber connections comprising:
    a housing;
    a cable spool assembly disposed on an exterior surface of the housing, the cable spool assembly having a first tear-away end and a second tear-away end, wherein the first and second tear-away ends include at least one area of weakness extending from an inner diameter of the cable spool assembly to an outer diameter of the cable spool assembly; and
    a mounting plate rotationally engaged with the cable spool assembly such that the cable spool assembly and the housing selectively and unitarily rotate about an axis of the mounting plate.

2. A fiber optic enclosure as claimed in claim 1, wherein the area of weakness is a perforation.

3. A fiber optic enclosure as claimed in claim 1, wherein the area of weakness is a reduced thickness of material.

4. A fiber optic enclosure as claimed in claim 1, wherein a first tear-away end of the cable spool assembly is in fastened engagement with the external surface of the housing.

5. A fiber optic enclosure as claimed in claim 1, wherein the housing includes a termination module.

6. A fiber optic enclosure as claimed in claim 5, wherein the termination module includes a plurality of sliding adapter modules.

7. A fiber optic enclosure as claimed in claim 1, wherein the area of weakness includes a radial area of weakness and a circular area of weakness.

8. A fiber optic enclosure as claimed in claim 7, wherein there are two radial areas of weakness and two circular areas of weakness disposed on each of the first and second tear-away ends.

9. A fiber optic enclosure as claimed in claim 1, wherein the first and second tear-away ends are a plastic material.

10. A method of paying out a subscriber cable from a fiber optic enclosure, comprising:
   rotating a housing and a cable spool assembly, which includes a subscriber cable coiled around a drum portion of the cable spool assembly, about an axis of a mounting plate of the fiber optic enclosure until a desired length of subscriber cable is paid out;
   splitting a tear-away end of the cable spool assembly at an area of weakness; and
   removing the tear-away end of the cable spool assembly from the cable spool assembly.

11. A method of paying out a subscriber cable from a fiber optic enclosure as claimed in claim 10, wherein connectorized ends of a first end of a subscriber cable are connected to a termination module in an interior region of the housing.

12. A method of paying out a subscriber cable from a fiber optic enclosure as claimed in claim 11, wherein the termination module includes a plurality of sliding adapter modules.

13. A method of paying out a subscriber cable from a fiber optic enclosure as claimed in claim 10, wherein the mounting plate is mounted to a wall.

14. A method of paying out a subscriber cable from a fiber optic enclosure as claimed in claim 10, further comprising fixing the position of the housing and the cable spool with respect to the mounting plate.

15. A method of paying out a subscriber cable from a fiber optic enclosure as claimed in claim 14, wherein a bracket fixes the position housing and the cable spool with respect to the mounting plate.

16. A fiber optic enclosure for enclosing optical fiber connections comprising:
   a housing;
   a cable spool assembly disposed at an exterior of the housing, the cable spool assembly having a drum portion about which a fiber optic cable is wrapped, the cable spool assembly also including and a flange portion that projects radially outwardly from the drum portion, wherein the flange portion includes at least one area of weakness for allowing at least a first region of the flange portion to be torn away from a remainder of the cable spool assembly after a length of the fiber optic cable has been dispensed from the cable spool assembly; and
   a mounting plate rotationally engaged with the cable spool assembly such that the cable spool assembly and the housing can rotate relative to the mounting plate in unison with one another about an axis of the mounting plate.

17. The fiber optic enclosure of claim 16, wherein the fiber optic cable includes a plurality of optical fibers, wherein each of the optical fibers is terminated by a fiber optic connector, wherein fiber optic adapters are provided at the housing, wherein the fiber optic connectors are inserted within the fiber optic adapters, and wherein the cable spool assembly and the housing can rotate relative to the mounting plate in unison with one another about an axis of the mounting plate while the fiber optic connectors remain inserted within the fiber optic adapters.

18. The fiber optic enclosure of claim 17, wherein the fiber optic adapters are located at least partially inside the housing.

19. The fiber optic enclosure of claim 18, wherein the fiber optic adapters are located entirely inside the housing.

20. The fiber optic enclosure of claim 16, wherein the area of weakness includes a first portion that extends along the flange portion in a radial direction relative to the drum portion.

21. The fiber optic enclosure of claim 20, wherein the area of weakness includes a second portion that extends along the flange portion in a circumferential direction relative to the drum portion.

22. The fiber optic enclosure of claim 21, wherein the flange portion includes an inner annular portion and an outer annular portion, wherein the first region includes the outer annular portion, and wherein the inner annular portion can remain attached to the drum portion after removal of the outer annular portion.

23. The fiber optic enclosure of claim 22, wherein the area of weakness also allows the inner annular portion to be removed from the drum portion.

24. The fiber optic enclosure of claim 16, wherein the area of weakness allows the entire flange portion to be removed from the drum portion.

25. The fiber optic enclosure of claim 16, wherein the area of weakness extends from an outer diameter to an inner diameter of the flange portion.

26. The fiber optic enclosure of claim 16, wherein the area of weakness extends at least partially between inner and outer diameters of the flange portion.

27. A method of paying out a subscriber cable comprising:
   rotating a housing and a cable spool assembly in unison about an axis to pay out a desired first length of fiber optic cable from the cable spool assembly, the cable spool assembly including a drum about which the fiber optic cable is wrapped, the cable spool assembly also including a flange that projects radially outwardly from the drum; and
   removing at least a first portion of the flange from a remainder of the cable spool assembly after the desired length of fiber optic cable has been paid off from the cable spool assembly.

28. The method of claim 27, wherein a second length of the fiber optic cable remains wrapped about the drum after the removing step.

29. The method of claim 28, wherein a second portion of the flange remains connected to the drum after the removing step.

30. The method of claim 27, wherein the entire flange is removed from the drum during the removing step.

* * * * *